(12) United States Patent
Yokoyama et al.

(10) Patent No.: US 8,290,677 B2
(45) Date of Patent: Oct. 16, 2012

(54) DRIVING ASSISTING APPARATUS

(75) Inventors: Akihisa Yokoyama, Susono (JP); Yuki Yamada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 851 days.

(21) Appl. No.: 12/201,401

(22) Filed: Aug. 29, 2008

(65) Prior Publication Data

US 2009/0076698 A1    Mar. 19, 2009

(30) Foreign Application Priority Data

Aug. 29, 2007   (JP) ................ P2007-222848

(51) Int. Cl.
*G06F 7/70* (2006.01)
(52) U.S. Cl. .......................... 701/70; 701/301
(58) Field of Classification Search ............ 701/9, 70, 701/81, 121, 301
See application file for complete search history.

(56) References Cited

U.S. PATENT DOCUMENTS

| | | | |
|---|---|---|---|
| 6,037,860 A * | 3/2000 | Zander et al. ............ | 340/436 |
| 6,701,242 B1 * | 3/2004 | Diebold .................... | 701/70 |
| 6,724,300 B2 * | 4/2004 | Miyakoshi et al. ....... | 340/435 |
| 6,850,170 B2 * | 2/2005 | Neff ........................... | 340/907 |
| 7,205,888 B2 * | 4/2007 | Isaji et al. ................. | 340/522 |
| 2005/0123173 A1 * | 6/2005 | Isaji et al. ................. | 382/104 |
| 2008/0243378 A1 * | 10/2008 | Zavoli ....................... | 701/209 |

FOREIGN PATENT DOCUMENTS

| | | |
|---|---|---|
| JP | 62-229398 | 10/1987 |
| JP | 7-72245 | 3/1995 |
| JP | 2003-141697 | 5/2003 |
| JP | 2004-199148 | 7/2004 |
| JP | 2005-165423 | 6/2005 |
| JP | 2006-139707 | 6/2006 |
| JP | 2006-318053 | 11/2006 |
| JP | 2007-99125 | 4/2007 |

* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

A driving assisting apparatus acquires a stoppable condition for allowing a vehicle to stop at a stop position and a driver characteristic concerning a driving operation for stopping the vehicle, and determines whether to determine the condition for starting assisting the driving operation according to the stoppable condition or driver characteristic depending on a running state of the vehicle. This sets the start condition for assisting the driving operation in view of the driver characteristic as well, thus making it possible to assist the driving operation in conformity to the driver's feelings.

8 Claims, 4 Drawing Sheets

DRIVING ASSISTING APPARATUS

BACKGROUND OF THE INVENTION

1. Field of the Invention

The present invention relates to a driving assisting apparatus for assisting a driver in a driving operation for stopping a vehicle at a stop position.

2. Related Background Art

An apparatus has been known which acquires the distance to the next intersection where the vehicle will pass, the time at which the traffic light at the intersection turns yellow, and the yellow traffic light duration, computes a running speed condition under which the vehicle can stop in front of the intersection and a running speed condition under which the vehicle can enter the intersection before the yellow traffic light turns off, and provides the driver with respective running speeds satisfying these conditions (see, for example, Japanese Patent Application Laid-Open No. 2006-139707). This apparatus allows the vehicle to safely pass the intersection or stop in front of the intersection.

SUMMARY OF THE INVENTION

The above-mentioned conventional apparatus assists the driver while taking account of vehicle characteristics and the like, such as speed, with no consideration for the driver's feelings. In general, the driving operation assisting timing based on vehicle characteristics and the like and the driving operation timing based on the driver's feelings often fail to coincide with each other. Therefore, when the driving operation is assisted without taking the driver's feelings into consideration, the driver may feel a sense of discomfort with the assisting timing, thereby distrusting the assisting system.

In view of the foregoing circumstances, it is an object of the present invention to provide a driving assisting apparatus which assists driving in conformity to the driver's feelings when assisting a stopping operation for stopping the vehicle at a stop position.

One aspect of the present invention is a driving assisting apparatus for assisting a driving operation for stopping a running vehicle at a stop position; the apparatus comprising stoppable condition acquiring means for acquiring a stoppable condition for allowing the vehicle to stop at the stop position, driver characteristic acquiring means for acquiring a driver characteristic concerning the driving operation for stopping the vehicle, and start condition setting means for setting a condition for starting assisting the driving operation; wherein the start condition setting means determines whether to determine the condition for starting assisting the driving operation according to the stoppable condition or driver characteristic depending on a running state of the vehicle.

In this driving assisting apparatus, a start condition in conformity to the running state of the vehicle is chosen from the stoppable condition and driver characteristic, whereby the start condition for assisting the driving operation is set in view of the driver's feelings as well. Therefore, when assisting the stopping operation for stopping the vehicle at the stop position, the driving operation can be assisted in conformity to the driver's feelings.

Preferably, the start condition setting means determines a first timing based on the stoppable condition and a second timing based on the driver characteristic as timings for starting assisting the driving operation, and sets an occurrence of the second timing as the start condition when the second timing is earlier than the first timing.

The stoppable condition for stopping the vehicle at a predetermined stop position depends on physical quantities such as the speed and weight of the vehicle and the coefficient of friction between a tire and the road surface. On the other hand, a timing which is considered favorable by each driver as a timing to start a stopping operation for stopping the vehicle at a predetermined stop position depends on feelings of the driver. When the timing based on the stoppable condition and the timing felt favorable by the driver do not coincide with each other as the timing for starting assisting the driving operation, the feel of discomfort imparted to the driver will increase if the assistance for the driving operation is started at the timing based on the stoppable condition. This feel of discomfort becomes remarkable in particular when the timing felt favorable by the driver is earlier than the timing based on the stoppable condition.

In this regard, when the second timing based on the driver characteristic is earlier than the first timing based on the stoppable condition, the occurrence of the second timing is employed as the timing for starting assisting the driving operation in the above-mentioned one aspect of the present invention. This can reduce the feel of discomfort imparted to the driver by a delay in the timing for starting assisting the driving operation.

Preferably, in this case, the start condition setting means acquires a timing at which a traffic light display state changes from a display indicating that the vehicle is passable to a display indicating that the vehicle is inhibited from passing, and employs the occurrence of the second timing as the start condition when the traffic light display state changing timing is earlier than the first timing but later than the second timing.

The start condition setting means acquires the second timing based on the driver characteristic, the first timing based on the stoppable condition, and the timing at which the traffic light display state changes from a display indicating that the vehicle is passable to a display indicating that the vehicle is inhibited from passing. When the traffic light display state changing timing is earlier than the first timing but later than the second timing, the assistance for the driving operation is started at the second timing. Therefore, the driving operation for stopping the vehicle can be assisted at a timing in conformity to the driver's feelings before the traffic light display state changes.

Preferably, the driving assisting apparatus further comprises notification control means for notifying the driver of an alarm, while the start condition setting means causes the notification control means to notify the driver of the alarm when the start condition is satisfied.

Providing such notification control means and making it issue the alarm allows the driver to recognize the timing for starting the stopping operation. Therefore, the driver can appropriately perform the stopping operation.

Preferably, in this case, the start condition setting means acquires a timing at which a traffic light display state changes from a display indicating that the vehicle is passable to a display indicating that the vehicle is inhibited from passing, and causes the notification control means to issue a notification only when the traffic light display state changing timing occurs before the vehicle running at a fixed speed passes the stop position.

Since the notification is issued only when the traffic light display state changing timing occurs before the vehicle passes the stop position, the driver is notified of the necessity to stop at the stop position only when necessary. This can prevent the driver from being provided with unnecessary notifications.

Preferably, the driver characteristic is stored as data concerning a distance felt necessary by the driver to stop the vehicle at a given speed and memorizing the speed and the distance in relation to each other.

When the start condition is set according to this data, the driving operation can be assisted at a more appropriate timing in conformity to the driver's feelings.

DESCRIPTION OF THE PREFERRED EMBODIMENTS

In the following, preferred embodiments of the driving assisting apparatus in accordance with the present invention will be explained in detail with reference to the drawings. In all the drawings, identical or equivalent parts will be referred to with the same numerals or letters.

Figure 1:
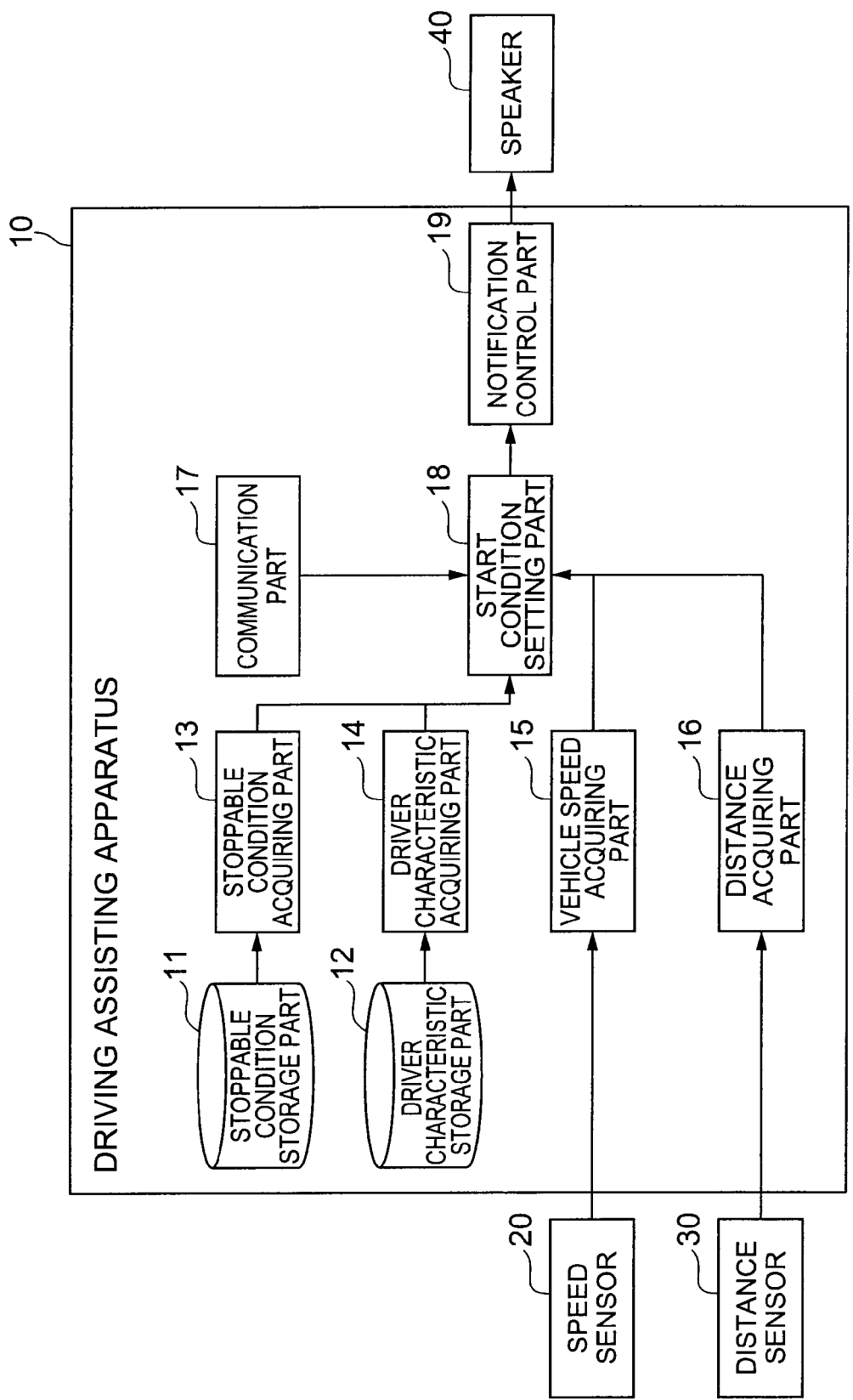
FIG. 1 is a block diagram showing the structure of a driving assisting apparatus.

FIG. 1 is a block diagram showing the structure of the driving assisting apparatus in accordance with the first embodiment of the present invention. As shown in FIG. 1, the driving assisting apparatus 10 comprises a stoppable condition storage part 11, a driver characteristic storage part 12, a stoppable condition acquiring part 13, and a driver characteristic acquiring part 14. The driving assisting apparatus 10 also comprises a vehicle speed acquiring part 15, a distance acquiring part 16, a communication part 17, and a start position control part 18. The driving assisting apparatus 10 further comprises a notification control part 19. A speed sensor 20, a distance sensor 30, and a speaker 40 are connected to the driving assisting apparatus 10.

The driving assisting apparatus 10, which is constructed by an ECU (Electronic Control Unit), comprises a CPU (Central Processing Unit), a ROM (Read Only Memory), a RAM (Random Access Memory), I/O interfaces, and the like.

The stoppable condition storage part 11 stores a stoppable condition for allowing a running vehicle to stop at a stop position. The driver characteristic storage part 12 learns and stores a driver characteristic concerning a driving operation for stopping the running vehicle. The above-mentioned stoppable condition and driver characteristic will now be explained with reference to FIG. 2.

Figure 2:
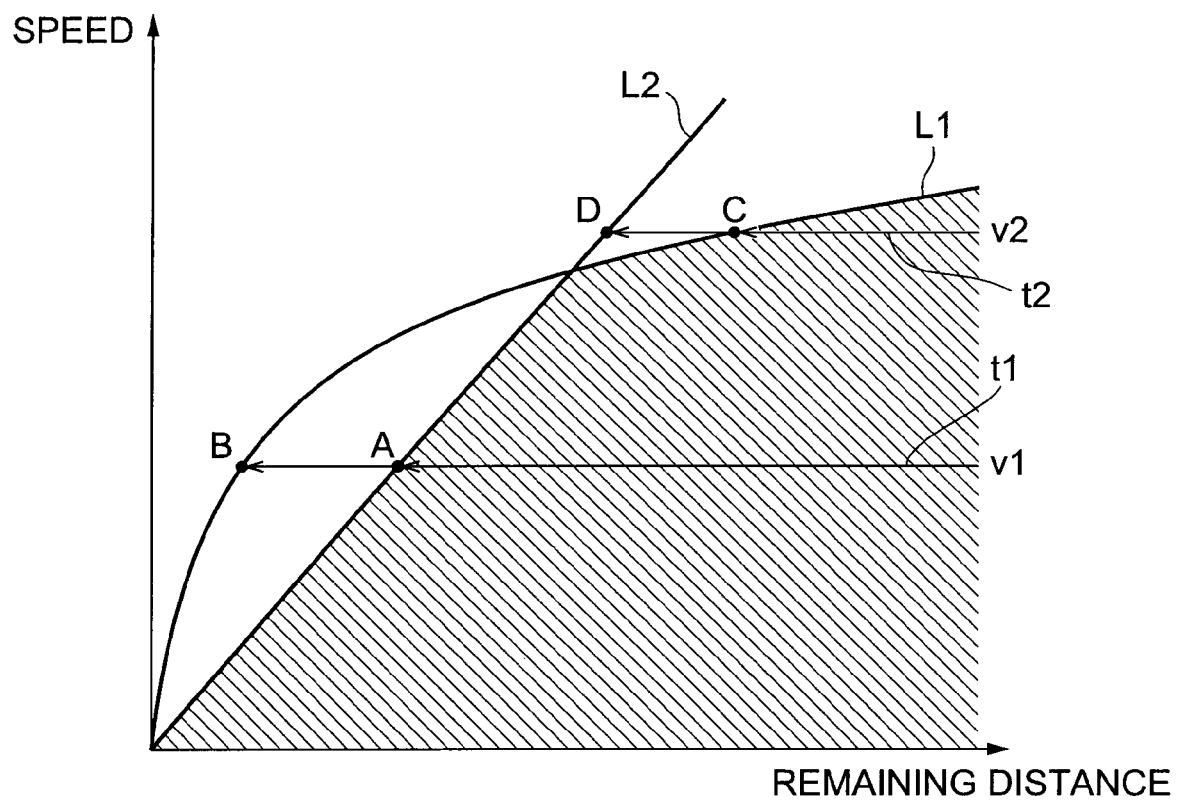
FIG. 2 is a graph showing relationships between speed and remaining distance when starting a stopping operation for stopping a running vehicle at a stop position.

FIG. 2 is a graph, whose abscissa and ordinate indicate the remaining distance, which is the distance to a stop position, and the vehicle speed, respectively, shows relationships between the speed and remaining distance when starting a stopping operation for stopping a running vehicle at the stop position. A curve L1 indicates a marginal condition (stoppable condition) under which the vehicle can stop at the stop position. This stoppable condition is determined according to physical quantities such as the weight of the vehicle and the coefficient of friction between a tire and the road surface. Therefore, the area on the lower right side of curve L1 represents the speed and remaining distance capable of stopping the vehicle when starting the stopping operation. A line L2 indicates a relationship between the speed and remaining distance (driver characteristic) where the driver feels that the stopping operation should be started for stopping the vehicle at the stop position. Therefore, the area on the right side of line L2 represents the speed and remaining distance at which the driver feels it possible to strop the vehicle when starting the stopping operation.

In FIG. 2, an arrow t1 directed to the left indicates a state where the vehicle is running at a fixed speed v1 to the stop position. This graph shows that the driver feels it possible to stop the vehicle running at the speed v1 at the stop position when starting the stopping operation before the remaining distance to the stop position becomes that indicated by a point A. The graph also shows that the vehicle running at the speed v1 can stop at the stop position when the stopping operation is started before the remaining distance to the stop position becomes that indicated by a point B. Here, the leftward arrow t1 successively intersects the line L2 and the curve L1 at the points A and B, respectively. This shows that the driver feels it necessary to start the stopping operation at a position leaving a longer remaining distance than that at a position to start the stopping operation which is determined according to the stoppable condition in the case where the vehicle is running at the speed v1.

On the other hand, an arrow t2 indicates a state where the vehicle is running to the stop position at a fixed speed v2 which is faster than the speed v1. Here, the leftward arrow t2 successively intersects the curve L1 and line L2 at points C and D, respectively. This shows that the vehicle running at the speed v2 cannot stop at the stop position even if the stopping operation is started when the remaining distance becomes that indicated by the point D according to the driver's feelings.

The gradient of the line L2 indicating the driver characteristic is determined by learning the driving operation performed by the driver. Though not depicted, the driving assisting apparatus 10 is equipped with a driver characteristic learning part and connected to a brake sensor. The brake sensor detects the fact that the stopping operation is performed by the driver, and sends this fact to the driver characteristic learning part. The driver characteristic learning part acquires the speed of the vehicle and its distance to the stop position when the stopping operation is performed. Also, the driver characteristic learning part stores and accumulates the acquired vehicle speed and distance to the stop position as learning data. Further, the driver characteristic learning part determines the gradient of line L2 according to the accumulated learning data, and causes the driver characteristic storage part 12 to store it as a driver characteristic.

The stoppable condition acquiring part 13 acquires the stoppable condition from the stoppable condition storage part 11. The stoppable condition acquiring part 13 sends thus acquired stoppable condition to the start condition setting part 18.

The driver characteristic acquiring part 14 acquires the driver characteristic from the driver characteristic storage part 12. The driver characteristic acquiring part 14 sends thus acquired driver characteristic to the start condition setting part 18.

The vehicle speed acquiring part 15 acquires vehicle speed information sent from the speed sensor 20. The vehicle speed acquiring part 15 sends thus acquired speed information to the start condition setting part 18.

The distance acquiring part 16 acquires distance information sent from the distance sensor 30. The distance information is information indicating the distance from the current position of the vehicle to the stop position. The distance acquiring part 16 sends thus acquired distance information to the start condition setting part 18.

By wireless communication, the communication part 17 acquires a timing at which the display state of a traffic light specified according to the current position of the vehicle changes. The communication part 17 can be constructed by a GPS (Global Positioning System), a VICS (Vehicle Information and Communication System), and the like. For example, the GPS acquires the current position of the vehicle. According to the acquired current position, the VICS specifies the next traffic light where the vehicle will pass and acquires a timing at which this traffic light changes its display state. The communication part 17 sends thus acquired traffic light display state changing timing to the start condition setting part 18.

The start condition setting part 18 sets a start condition for assisting the driver in the driving operation. The start condition for assisting the driving operation is determined according to the stoppable condition sent from the stoppable condition acquiring part 13, the driver characteristic sent from the driver characteristic acquiring part 14, the speed information sent from the vehicle speed acquiring part 15, the distance information sent from the distance acquiring part 16, and the traffic light display state changing timing sent from the communication device 17. Processes for setting the start condition for assisting the driving operation will be explained later in detail.

According to the start condition for assisting the driving operation set by the start condition setting part 18, the notification control part 19 causes the speaker 40 to issue an alarm for assisting the driving operation. For example, when a timing for starting a stopping operation is set by the start condition setting part 18, the notification control part 19 sends an alarm signal to the speaker 40 at an occurrence of this timing, so as to cause the speaker 40 to issue the alarm for assisting the driving operation.

The speed sensor 20 detects the speed of the vehicle as speed information. For example, the speed sensor 20 can be constructed by a sensor which is attached to a wheel and measures the rotational speed of the wheel. The speed sensor 20 sends the detected speed information of the vehicle to the vehicle speed acquiring part 15.

The distance sensor 30 detects the distance from the current position of the vehicle to the stop position as distance information. For example, the distance sensor 30 can be constructed by an image sensor which is provided in the front end part of the vehicle and captures an image of an object. Thus constructed distance sensor 30 determines the distance to the object according to the position of the object within the captured image. The distance sensor 30 sends the detected information about the distance to the stop position to the distance acquiring part 16.

In response to the alarm signal acquired from the notification control part 19, the speaker 40 notifies the driver of an alarm for assisting the driving operation.

Figure 3:
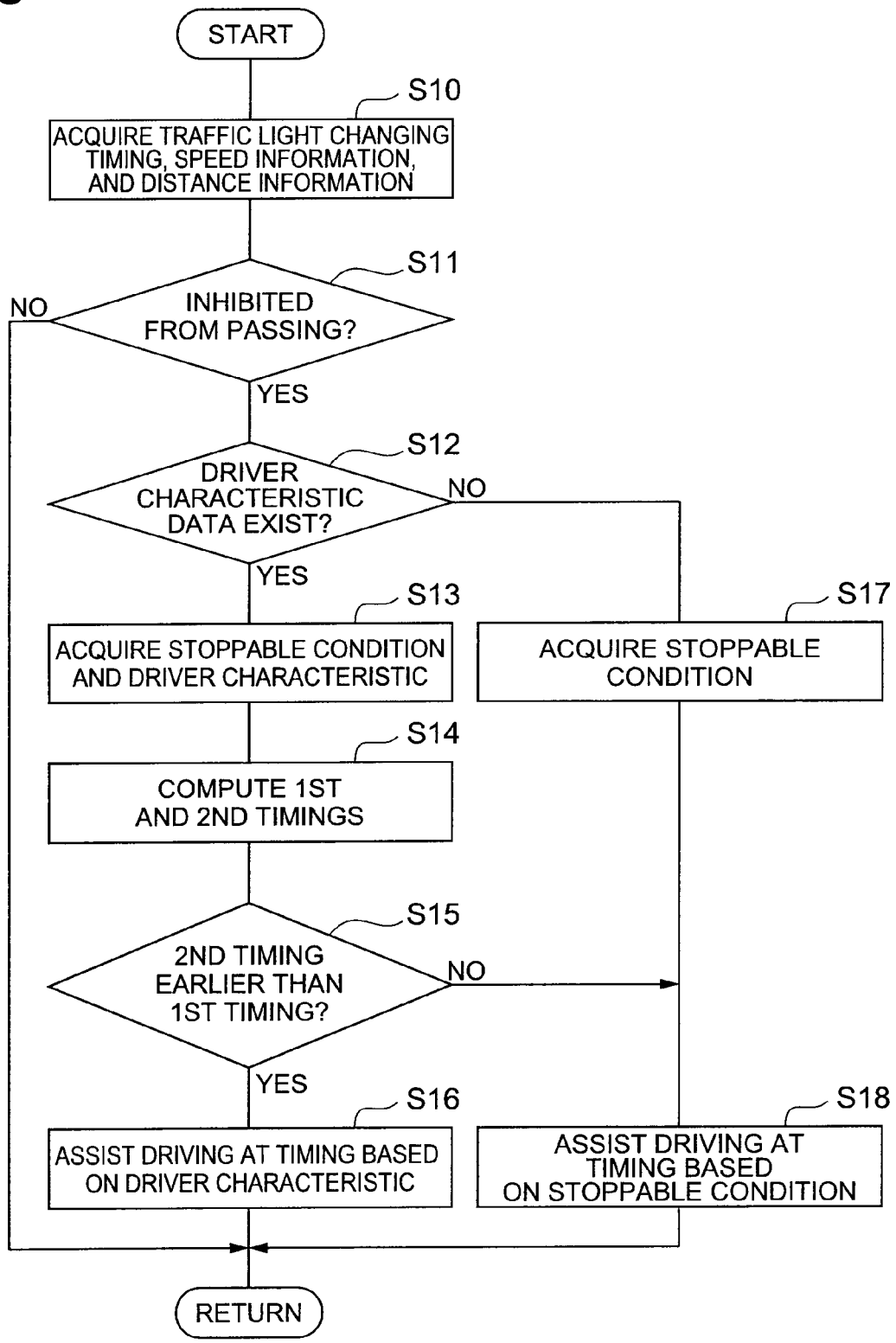
FIG. 3 is a flowchart showing a processing procedure of the driving assisting apparatus in accordance with a first embodiment.

FIG. 3 is a flowchart showing a processing procedure which is executed by the driving assisting apparatus 10 in accordance with the first embodiment in order to assist the driver in the driving operation.

At step S10, the communication part 17 acquires a timing at which the traffic light display state changes from a display indicating that the vehicle is passable to a display indicating that the vehicle is inhibited from passing, and sends thus acquired traffic light display state changing timing to the start condition setting part 18. The vehicle speed acquiring part 15 acquires speed information of the vehicle, and sends thus acquired speed information to the start condition setting part 18. The distance acquiring part 16 acquires information about the distance to the stop position, and sends thus acquired distance information to the start condition setting part 18. Hence, the start condition setting part 18 acquires thus sent traffic light display state changing timing, speed information, and distance information.

At step S11, according to the traffic light display state changing timing, speed information, and distance information acquired at step S10, the start condition setting part 18 determines whether or not the traffic light display state changing timing occurs before the vehicle running at a fixed speed passes the stop position. The timing at which the vehicle passes the stop position is determined by adding the time value obtained by dividing the distance information value by the speed information value to the current time. Thus determined timing at which the vehicle passes the stop position and the traffic light display state changing timing are compared with each other. When the traffic light display state changing timing is earlier than the timing at which the vehicle passes the stop position, the flow shifts to step S12. When the traffic light display state changing timing is not earlier than the timing at which the vehicle passes the stop position, on the other hand, there is no need for assisting the driving operation, whereby the process is terminated.

At step S12, the driver characteristic acquiring part 14 determines whether or not data storing a driver characteristic exists in the driver characteristic storage part 12. When the data storing the driver characteristic exists in the driver characteristic storage part 12, the flow shifts to step S13. The driver characteristic is determined according to the learning data accumulated by the driver characteristic learning part. When the accumulation of such learning data is not sufficient for determining the driver characteristic, the driver characteristic learning part cannot determine the driver characteristic. In this case, there is no data storing the driver characteristic in the driver characteristic storage part 12. When no data storing the driver characteristic exists in the driver characteristic storage part 12, the flow shifts to step S17.

At step S17, the stoppable condition acquiring part 13 acquires a stoppable condition from the stoppable condition storage part 11, and sends thus acquired stoppable condition to the start condition setting part 18. Subsequently, the flow shifts to step S18.

At step S13, the start condition setting part 18 acquires the stoppable condition sent from the stoppable condition acquiring part 13 after being obtained from the stoppable condition storage part 11. The start condition setting part 18 also acquires the driver characteristic sent from the driver characteristic acquiring part 14 after being obtained from the driver characteristic storage part 12.

At step S14, according to the speed information obtained from the vehicle speed acquiring part 15 and the driver characteristic obtained from the driver characteristic acquiring part 14, the start condition setting part 18 determines a timing for starting assisting the driving operation (hereinafter referred to as "second timing"). The second timing corresponds to the point A in FIG. 2 when the vehicle runs at the speed v1. According to the speed information obtained from the vehicle speed acquiring part 15 and the stoppable condition acquired from the stoppable condition acquiring part 13, the start condition setting part 18 determines a timing for starting assisting the driving operation (hereinafter referred to as "first timing"). The first timing corresponds to the point B in FIG. 2 when the vehicle runs at the speed v1.

At step S15, the start condition setting part 18 determines whether or not the second timing is earlier than the first timing. When the second timing is earlier than the first timing, the flow shifts to step S16. When the second timing is later than the first timing, the flow shifts to step S18.

As in the foregoing, the first embodiment determines respective timings for starting assisting the driving operation according to the driver characteristic and stoppable condition corresponding to the speed of the running vehicle, and sets an occurrence of the earlier of the determined timings as a start condition for assisting the driving. Thus, the assistance for the driving operation begins at the occurrence of the timing based on the driver characteristic when the driver feels that the assisting timing will be too late to stop the vehicle if the assistance for the driving operation is started at the occurrence of the first timing based on the stoppable condition, whereby the driving operation can be assisted at the timing in conformity to the driver's feelings. This specifically corresponds to starting assisting the driving operation at the occurrence of the timing indicated by the point A in FIG. 2 when the driver feels that the vehicle running at the speed v1 cannot be stopped if the assistance for the driving operation begins at the occurrence of the timing indicated by the point B. When the speed of the vehicle is so fast that the vehicle cannot be stopped at the stop position if the driver conducts the stopping operation according to feelings, however, the assistance for the driving operation is started at the occurrence of the first timing based on the stoppable condition. This specifically corresponds to starting assisting the driving operation at the occurrence of the timing indicated by the point C in FIG. 2, since the vehicle running at the speed v2 cannot be stopped by performing the stopping operation at the occurrence of the timing indicated by the point D. This makes it possible to realize the assistance for the driving operation with lesser sense of discomfort to the driver, while contributing to stopping the vehicle more safely.

At step S16, the start condition setting part 18 causes the notification control part 19 to notify the driver of an alarm in order to start assisting the driving operation at the occurrence of the second timing.

At step S18, the start condition setting part 18 causes the notification control part 19 to notify the driver of an alarm in order to start assisting the driving operation at the occurrence of the first timing.

Thus, the driving assisting apparatus 10 terminates the process for assisting the driver in the driving operation.

Figure 4:
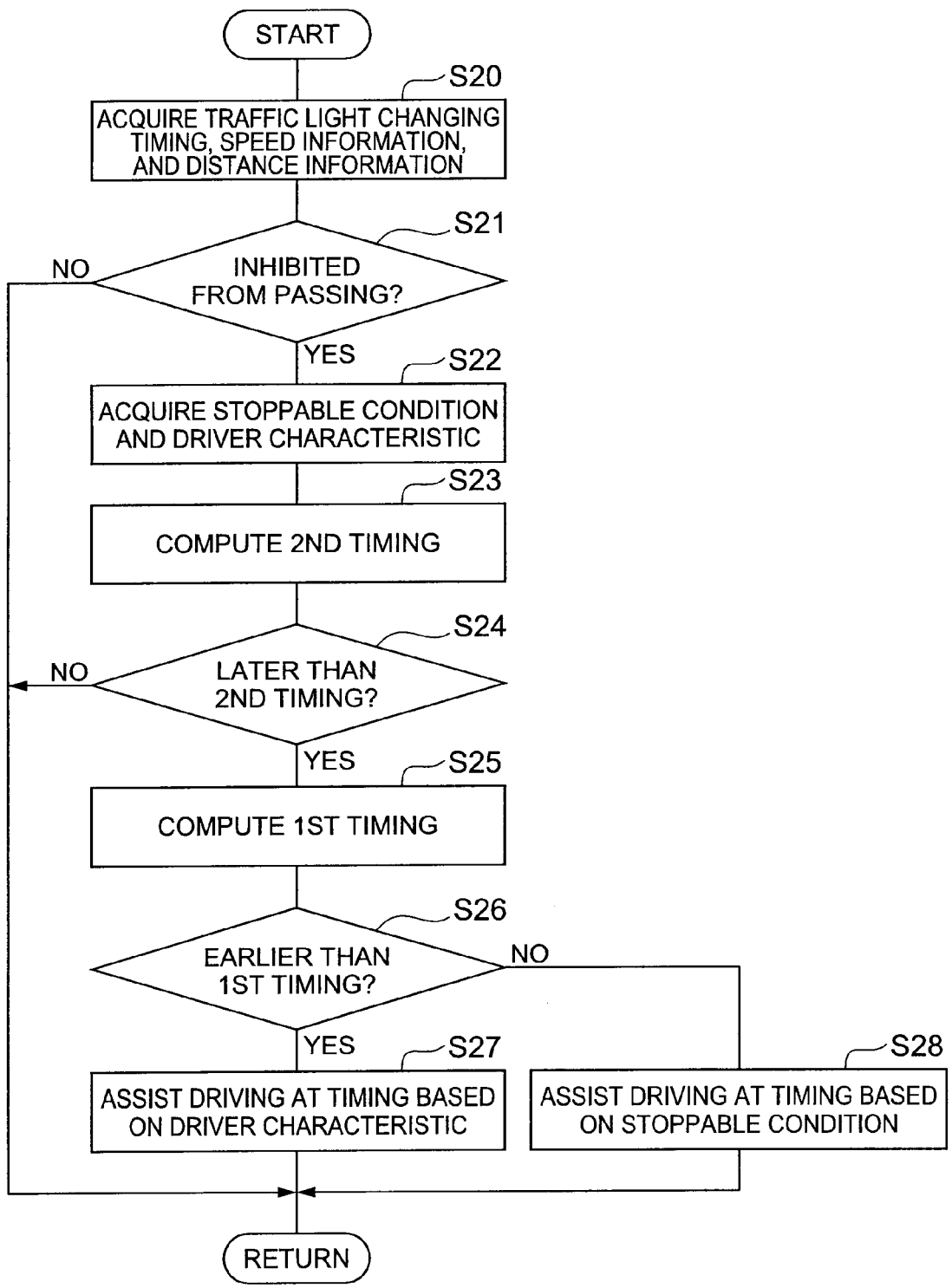
FIG. 4 is a flowchart showing a processing procedure of the driving assisting apparatus in accordance with a second embodiment.

The second embodiment of the present invention will now be explained. The block diagram of the driving assisting apparatus in accordance with the second embodiment is the same as that of the first embodiment shown in FIG. 1. FIG. 4 is a flowchart showing a processing procedure which is executed by the driving assisting apparatus 10 in accordance with the second embodiment in order to assist the driver in the driving operation. This processing procedure assumes that data storing the driver characteristic exists in the driver characteristic storage part 12 without performing the process at step S12 of FIG. 3 in accordance with the first embodiment. For example, driver characteristics of typical drivers may be stored in the driver characteristic storage part 12. In this case, data storing a certain driver characteristic always exists in the driver characteristic storage part 12. As in the first embodiment, the driver characteristic learning part accumulates the driving operation of the driver as learning data and updates the driver characteristic stored in the driver characteristic storage part 12 with a new driver characteristic determined according to the accumulated learning data.

At step S20, the communication device 17 acquires a timing at which the traffic light display state changes from a display indicating that the vehicle is passable to a display indicating that the vehicle is inhibited from passing, and sends thus acquired traffic light display state changing timing to the start condition setting part 18. The vehicle speed acquiring part 15 acquires speed information of the vehicle, and sends thus acquired speed information to the start condition setting part 18. The distance acquiring part 16 acquires information about the distance to the stop position, and sends thus acquired distance information to the start condition setting part 18. Hence, the start condition setting part 18 acquires thus sent traffic light display state changing timing, speed information, and distance information.

At step S21, according to the traffic light display state changing timing, speed information, and distance information acquired at step S20, the start condition setting part 18 determines whether or not the traffic light display state changing timing occurs before the vehicle running at a fixed speed passes the stop position. The timing at which the vehicle passes the stop position is determined by adding the time value obtained by dividing the distance information value by the speed information value to the current time. Thus determined timing at which the vehicle passes the stop position and the traffic light display state changing timing are compared with each other. When the traffic light display state changing timing is earlier than the timing at which the vehicle passes the stop position, the flow shifts to step S22. When the traffic light display state changing timing is not earlier than the timing at which the vehicle passes the stop position, on the other hand, there is no need for assisting the driving operation, whereby the process is terminated.

At step S22, the start condition setting part 18 acquires the stoppable condition sent from the stoppable condition acquiring part 13 after being obtained from the stoppable condition storage part 11. The start condition setting part 18 also acquires the driver characteristic sent from the driver characteristic acquiring part 14 after being obtained from the driver characteristic storage part 12.

At step S23, according to the speed information obtained from the vehicle speed acquiring part 15 and the driver characteristic obtained from the driver characteristic acquiring part 14, the start condition setting part 18 determines the second timing. The second timing corresponds to the point A in FIG. 2 when the vehicle runs at the speed v1.

At step S24, the start condition setting part 18 determines whether or not the timing at which the traffic light display state changes from a display indicating that the vehicle is passable to a display indicating that the vehicle is inhibited from passing is later than the second timing. When the traffic light display state changing timing is later than the second timing, the flow shifts to step S25. When the traffic light display state changing timing is earlier than the second timing, on the other hand, the driver can fully recognize the change in the traffic light display state, thus requiring no assistance for the driving operation, whereby the process is terminated.

At step S25, according to the speed information obtained from the vehicle speed acquiring part 15 and the stoppable condition obtained from the stoppable condition acquiring part 13, the start condition setting part 18 determines the first timing. The first timing corresponds to the point B in FIG. 2 when the vehicle runs at the speed v1.

At step S26, the start condition setting part 18 determines whether or not the timing at which the traffic light display state changes from a display indicating that the vehicle is passable to a display indicating that the vehicle is inhibited from passing is earlier than the first timing. When the traffic light display state changing timing is earlier than the first timing, the flow shifts to step S27. When the traffic light display state changing timing is later than the first timing, the flow shifts to step S28.

At step S27, the start condition setting part 18 causes the notification control part 19 to notify the driver of an alarm in order to start assisting the driving operation at the occurrence of the second timing.

At step S28, the start condition setting part 18 causes the notification control part 19 to notify the driver of an alarm in order to start assisting the driving operation at the occurrence of the first timing.

Thus, the driving assisting apparatus 10 terminates the process for assisting the driver in the driving operation.

As in the foregoing, when the timing at which the traffic light display state changes from a display indicating that the vehicle is passable to a display indicating that the vehicle is inhibited from passing is earlier than the timing determined according to the stoppable condition but later than the timing determined according to the driver characteristic, the second embodiment sets an occurrence of the timing determined according to the driver characteristic as the start condition for assisting the driving. This specifically corresponds to setting the occurrence of the timing indicated by the point A as the start condition for assisting the driving when the traffic light display state changing timing is earlier than the timing indicated by the point B but later than the timing indicated by the point A in FIG. 2. This makes it possible to start assisting the driver in the driving operation for stopping the vehicle at a timing which imparts lesser sense of discomfort to the driver before the traffic light display state changes. When the timing at which the traffic light display state changes from a display indicating that the vehicle is passable to a display indicating that the vehicle is inhibited from passing is later than the timing determined according to the stoppable condition, the occurrence of the timing determined according to the stoppable condition is set as the start condition for assisting the driving. This specifically corresponds to setting the occurrence of the timing indicated by the point B as the start condition for assisting the driving when the traffic light display state changing timing is later than the timing indicated by the point B. This makes it possible to start assisting the driver in the driving operation for stopping the vehicle beforehand at a timing which can safely stop the vehicle.

While preferred embodiments of the present invention are explained in the foregoing, the present invention is not limited thereto. Though the driver characteristic is updated with results of learning driving characteristics of the driver in the above-mentioned embodiments, information concerning environmental factors such as road surface states may be acquired, and the driver characteristic may be updated according to thus acquired information. When the road surface is wet, for example, the driver considers it better to start the stopping operation at a timing earlier than usual. Therefore, when information that the road surface is wet is acquired, the driver characteristic may be changed such as to reduce the gradient of line L2 in FIG. 2. The driver characteristic may be updated according to both of the result of learning the driving characteristics of the driver and information concerning the environmental factors such as road surface states. A driver characteristic of a typical driver may be stored in the driver characteristic storage part 12 beforehand and continuously used for determining the second timing without updating.

As explained in detail in the foregoing, when assisting the stopping operation for stopping the vehicle at the stop position, the driving assisting apparatus in accordance with the embodiments can assist the driving in conformity to the driver's feelings.

What is claimed is:

1. A driving assisting apparatus for assisting a driving operation for stopping a running vehicle at a stop position, the apparatus comprising:
    stoppable condition acquiring means for acquiring a stoppable condition for allowing the vehicle to stop at the stop position;
    driver characteristic acquiring means for acquiring a driver characteristic concerning the driving operation for stopping the vehicle; and
    start condition setting means for setting a condition for starting assisting the driving operation;
    wherein the start condition setting means determines whether to determine the condition for starting assisting the driving operation by selecting one of the stoppable condition or driver characteristic, depending on a running state of the vehicle,
    wherein the start condition setting means determines a first timing based on the stoppable condition and a second timing based on the driver characteristic as timings for starting assisting the driving operation, and sets an occurrence of the second timing as the start condition when the second timing is earlier than the first timing, and
    wherein the start condition setting means acquires a timing at which a traffic light display state changes from a display indicating that the vehicle is passable to a display indicating that the vehicle is inhibited from passing, and employs the occurrence of the second timing as the start condition when the traffic light display state changing timing is earlier than the first timing but later than the second timing.

2. A driving assisting apparatus according to claim 1, further comprising notification control means for notifying the driver of an alarm;
    wherein the start condition setting means causes the notification control means to notify the driver of the alarm when the start condition is satisfied.

3. A driving assisting apparatus according to claim 2, wherein the start condition setting means acquires a timing at which a traffic light display state changes from a display indicating that the vehicle is passable to a display indicating that the vehicle is inhibited from passing, and causes the notification control means to issue a notification only when the traffic light display state changing timing occurs before the vehicle running at a fixed speed passes the stop position.

4. A driving assisting apparatus according to claim 1,
    wherein the driver characteristic is stored as data concerning a distance felt necessary by the driver to stop the vehicle at a given speed.

5. A driving assisting apparatus for assisting a driving operation for stopping a running vehicle at a stop position, the apparatus including a control unit;
    the control unit comprising:
    a stoppable condition acquiring part configured to acquire a stoppable condition for allowing the vehicle to stop at the stop position;
    a driver characteristic acquiring part configured to acquire a driver characteristic concerning the driving operation for stopping the vehicle; and
    a start condition setting part configured to set a condition for starting assisting the driving operation;
    wherein the start condition setting part determines whether to determine the condition for starting assisting the driving operation by selecting one of the stoppable condition or driver characteristic, depending on a running state of the vehicle, wherein the start condition setting part determines a first timing based on the stoppable condition and a second timing based on the driver characteristic as timings for starting assisting the driving operation, and sets an occurrence of the second timing as the start condition when the second timing is earlier than the first timing, and wherein the start condition setting part acquires a timing at which a traffic light display state changes from a display indicating that the vehicle is passable to a display indicating that the vehicle is inhibited from passing, and employs the occurrence of the second timing as the start condition when the traffic light display state changing timing is earlier than the first timing but later than the second timing.

6. A driving assisting apparatus according to claim 5, further comprising a notification control part for notifying the driver of an alarm;

wherein the start condition setting part causes the notification control part to notify the driver of the alarm when the start condition is satisfied.

7. A driving assisting apparatus according to claim 6, wherein the start condition setting part acquires a timing at which a traffic light display state changes from a display indicating that the vehicle is passable to a display indicating that the vehicle is inhibited from passing, and causes the notification control part to issue a notification only when the traffic light display state changing timing occurs before the vehicle running at a fixed speed passes the stop position.

8. A driving assisting apparatus according to claim 5, wherein the driver characteristic is stored as data concerning a distance felt necessary by the driver to stop the vehicle at a given speed.

\* \* \* \* \*